United States Patent
Ho et al.

(10) Patent No.: US 7,287,213 B1
(45) Date of Patent: Oct. 23, 2007

(54) METHOD AND SYSTEM TO PROVIDE MODULAR PARALLEL PRECODING IN OPTICAL DUOBINARY TRANSMISSION SYSTEMS

(75) Inventors: Ricky Keang-Po Ho, San Jose, CA (US); Joseph M. Kahn, San Carlos, CA (US)

(73) Assignee: Stratalight Communications, Inc., Campbell, CA (US)

( * ) Notice: Subject to any disclaimer, the term of this patent is extended or adjusted under 35 U.S.C. 154(b) by 1359 days.

(21) Appl. No.: 09/841,799

(22) Filed: Apr. 24, 2001

(51) Int. Cl.
*G06F 11/00* (2006.01)
(52) U.S. Cl. ...................... 714/801; 398/140
(58) Field of Classification Search ............... 359/154, 359/181, 184, 185, 186, 191; 375/242, 247, 375/300; 714/805
See application file for complete search history.

(56) References Cited

U.S. PATENT DOCUMENTS

| | | | |
|---|---|---|---|
| 5,373,382 A | 12/1994 | Pirio et al. .................. 359/181 |
| 5,543,952 A | 8/1996 | Yonenaga et al. .......... 359/181 |
| 5,825,204 A * | 10/1998 | Hashimoto .................. 326/54 |
| 5,867,534 A | 2/1999 | Price et al. ................... 375/2 |
| 5,892,858 A | 4/1999 | Vaziri et al. ................ 385/2 |
| 5,917,638 A | 6/1999 | Franck et al. ............... 359/181 |
| 6,027,243 A * | 2/2000 | Owada ........................ 714/801 |
| 6,097,525 A | 8/2000 | Ono et al. ................... 359/181 |
| 6,388,786 B1 * | 5/2002 | Ono et al. ................... 398/183 |
| 6,522,438 B1 * | 2/2003 | Mizuhara .................... 398/189 |
| 6,595,707 B1 * | 7/2003 | Kuwata ....................... 398/140 |
| 6,643,471 B2 * | 11/2003 | Gurusami et al. .......... 398/189 |
| 6,934,308 B1 * | 8/2005 | Yonenaga et al. .......... 370/535 |

FOREIGN PATENT DOCUMENTS

EP  1 026 863 A2  8/2000

OTHER PUBLICATIONS

M. J. O'Mahony, "Duobinary Transmission with p-i-n F.E.T. Optical Receivers," *Electronics Letters*, vol. 16, No. 19, Sep. 11, 1980, pp. 752-753.
X Gu et al., "10 Gbit/s Unrepeatered Three-Level Optical Transmission Over 10 km of Standard Fiber," *Electronics Letters*, vol. 29, No. 25, Dec. 9, 1993, pp. 2209-2211.
A. J. Price et al., 210 km Repeaterless 10 Gb/s Transmission Experiment Through Nondispersion-Shifted Fiber Using Partial Response Scheme, *IEEE Photonics Technology Letters*, vol. 7, No. 10, Oct. 1995, pp. 1219-1221.
M. Yoneyama et al., Differential Precoder IC Modules for 20- ad 40-Gbit/s Optical Duobinary Transmission Systems, *IEEE Transactions on Microwave Theory and Techniques*, vol. 47, No. 12, Nov. 1999, pp. 2263-2270.
K. Murata et al., "Parallel Precoder IC Module for 40-Gbit/s Optical Duobinary Transmission Systems," *Electronics Letters*, vol. 36, No. 18, Aug. 21, 2000, pp. 1571-1572.

* cited by examiner

*Primary Examiner*—Guy Lamarre
*Assistant Examiner*—Sam Rizk
(74) *Attorney, Agent, or Firm*—Pillsbury Winthrop Shaw Pittman LLP (57) ABSTRACT

A circuit using modular based parallel processing calculates the cumulative parity of a binary number input sequence. The circuit is used, for example, to implement a precoder for an optical duobinary transmission system. The design permits a relatively low-speed circuit to be used as the precoder before a time-division multiplexer. The parallel circuit can be scalable to process a very large number of sets of parallel binary data by the usage of two basic modules, namely, a parity module and a delay module.

40 Claims, 7 Drawing Sheets

METHOD AND SYSTEM TO PROVIDE MODULAR PARALLEL PRECODING IN OPTICAL DUOBINARY TRANSMISSION SYSTEMS

FIELD OF THE INVENTION

The present invention is directed to communications systems, and more particularly to systems and methods for calculating the cumulative parity of a binary number sequence using modular based parallel processing.

BACKGROUND

It is well known that in optical communication systems conveying digital information, whether the digital information is transmitted as single signal at a single carrier wavelength or as multiple signals at different carrier wavelengths (i.e., wavelength-division multiplexing), for a fixed bit rate per carrier wavelength, it is beneficial to design the transmitted signal to have a narrow optical spectrum. The narrow optical spectrum allows two wavelength-division-multiplexed channels close to each other, and usually provides more tolerance to the chromatic dispersion of the optical fiber.

Numerous patents and research papers have documented the use of on-off keying with duobinary filtering in optical communication systems. All of these works have utilized precoding to permit symbol-by-symbol detection without error propagation. While those works have described many different techniques to implement precoding, duobinary filtering, and modulation of the duobinary signal onto the optical carrier, all of these techniques result in transmission of equivalent optical signals, which take on one of three possible electric-field amplitude values, e.g., {−a, 0, a}. With a precoder, it is possible to recover the transmitted information bits by performing symbol-by-symbol detection on a signal proportional to the received optical intensity, such as the photocurrent in a direct-detection receiver. This technique also narrows the optical spectrum by about a factor of two as compared to on-off keying.

Figure 1:
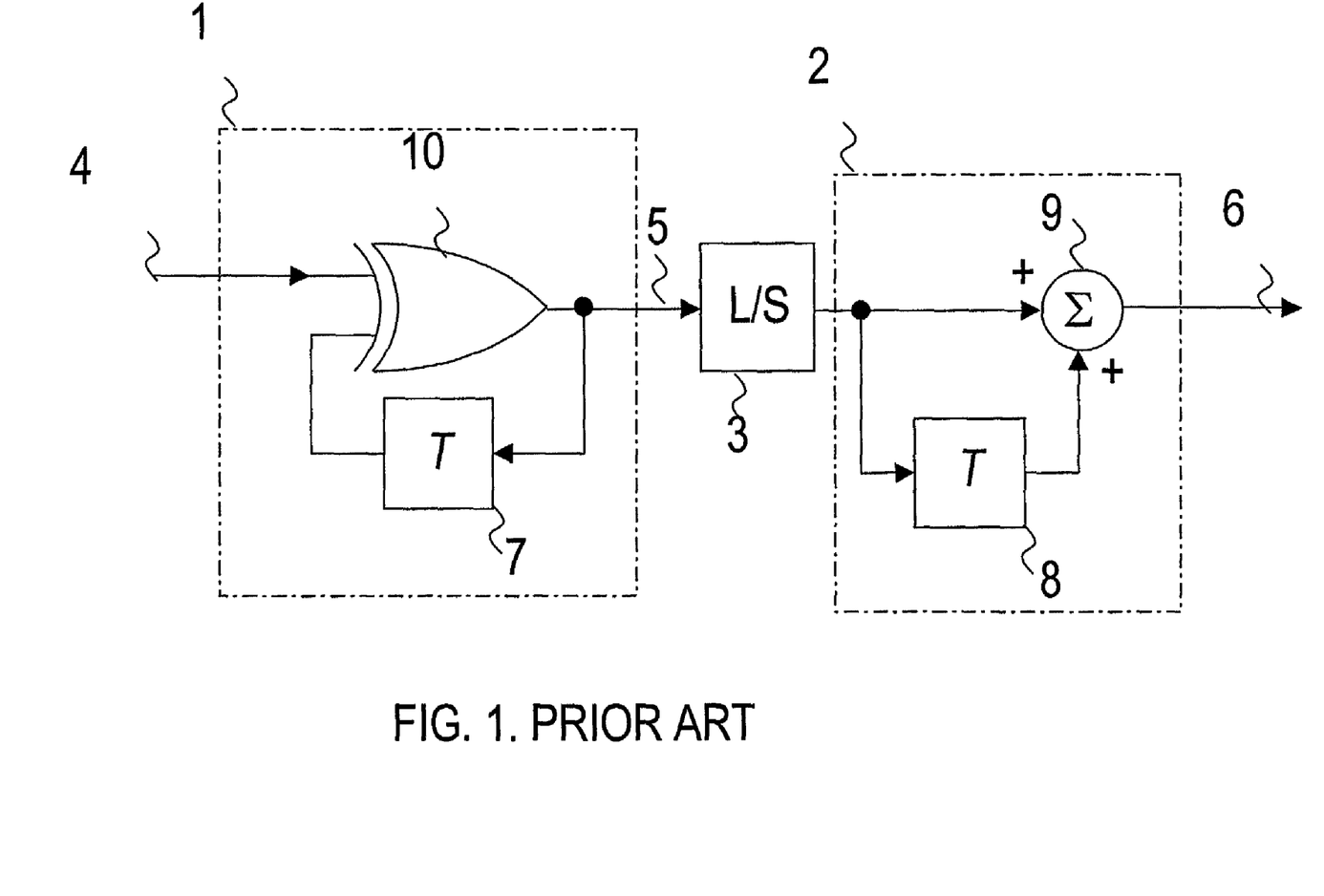
FIG. 1 is a block diagram illustrating a precoder and duobinary filter as implemented in a transmitter in a conventional optical duobinary transmission system.

FIG. 1 is a block diagram illustrating a precoder 1 and a duobinary filter 2 as implemented in a transmitter in a conventional optical duobinary transmission system. To facilitate symbol-by-symbol detection, as shown in FIG. 1, the precoder 1 is used before the duobinary filter 2. Between the precoder 1 and the duobinary filter 2, the level shifter (L/S) 3 changes a logic value of "1" to a positive amplitude value of a/2 and a logic value of "0" to a negative amplitude value of −a/2. The precoder 1 is formed by an exclusive-OR (XOR) gate circuit 10 and a one-bit delay 7. The precoder 1 inverts the logical value of the output 5 only when the logical value of its input signal 4 is "1", and maintains the logical value of the output when the logical value of its input signal is "0". The logical value of the output 5, delayed by the one-bit delay 7 is fed back to an input of the XOR gate 10. Mathematically, the precoder 1 calculates the cumulative parity of the binary number input sequence 4.

The duobinary filter 2 separates the signal to two branches, one of the branches is delayed by a one-bit delay 8 and combined with another branch without delay at a summer 9. The output 6 of the duobinary filter 2 is usually loss-passed and sent to an external modulator in particular, and an optical modulation subsystem in general.

In the precoder 1 of FIG. 1, the preceding circuit has to operate in the same rate as the serial binary input 4. Problems generally occur for high data transmission rates, for example, 10-, 40-, 80-, 100-, and 160-Gb/s input signals. First, a high-speed XOR gate may not be available or may be quite expensive. Second, the realization of one-bit delay for the XOR gate is difficult. The one-bit delay 7 can utilize the propagation time of the feedback transmission line or can use a D-type flip-flop. If the propagation delay of the XOR gate 10 cannot be ignored compared with a time-slot of one bit due to the increase of the transmission rate, the delay time for the feedback to the XOR gate would become longer than one time-slot time.

Figure 2:
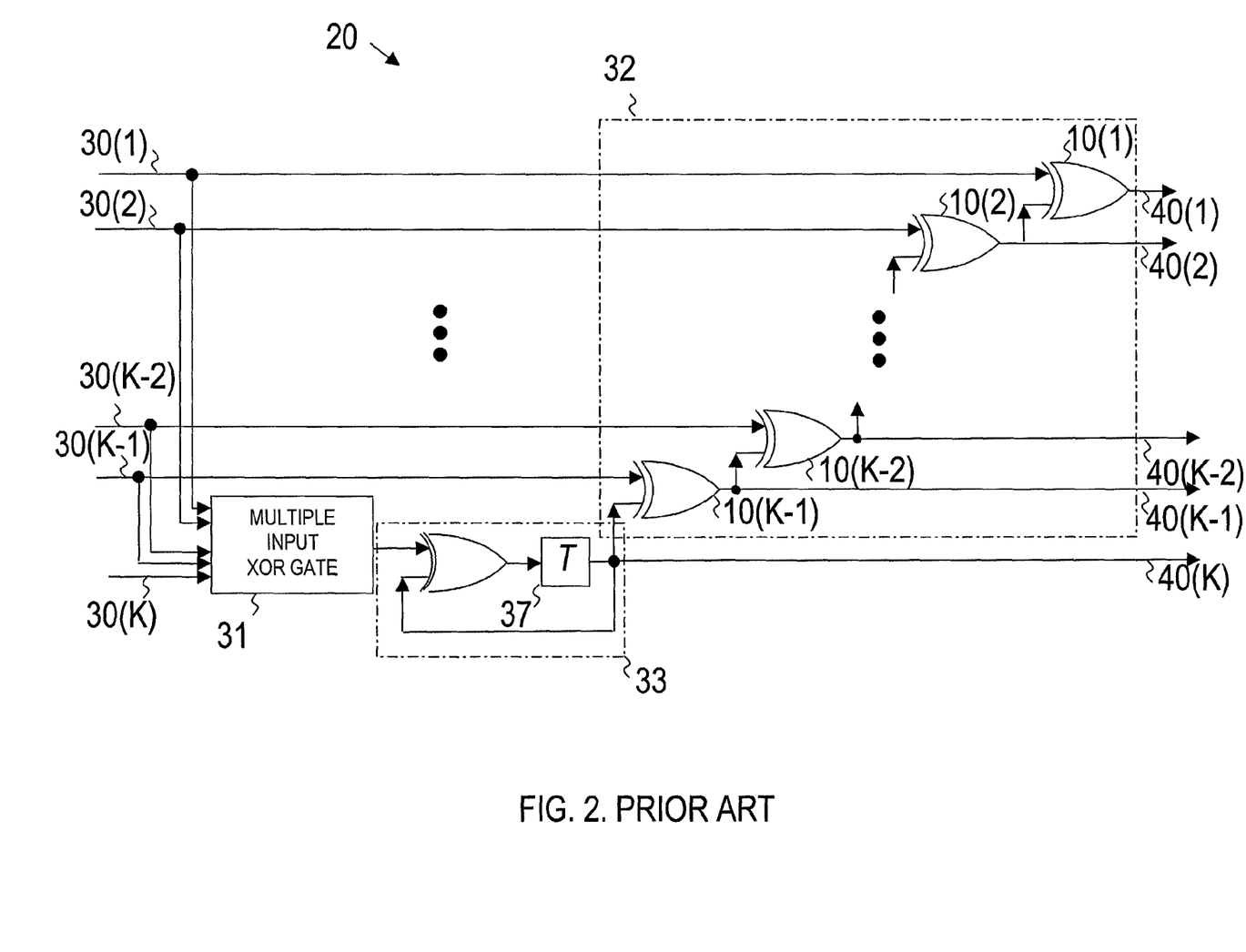
FIG. 2 is a block diagram illustrating the detailed configuration of a conventional differential precoder as implemented in a parallel circuit.

Referring to FIG. 2, it is a block diagram illustrating the detailed configuration 20 of a conventional differential precoder as described in the prior art. For example, parallel precoding circuits are described in the European patent application of EP 1 026 863 A2 filed Mar. 2, 2000 and published Sep. 18, 2000, the paper of Yoneyama et al. ("Differential Precoder IC Modules for 20- and 40-Gbit/s Optical Duobinary Transmission Systems," IEEE Transactions on Microwave Theory and Techniques, vol. 47, no. 12, November 1999, pp. 2263-2270), and the paper of K. Murata et al. ("Parallel precoder IC module for 40-Gbit/s optical duobinary transmission systems," Electronics Letters, vol. 36, no. 18, Aug. 31, 2000, pp. 1571-1572). The circuit 20 of FIG. 2 uses a multiple input XOR gate 31 to calculate the parity of K sets of parallel data 30, followed by a differential circuit 33 similar to the precoder 1, a one-bit delay 37, and a ladder of XOR gates 32 to calculate each of the individual outputs 40. The multi-input XOR gate 31 is by itself a very complicated circuit, requiring many two-input logic gates. One implementation of the multi-input XOR gate can use a ladder of XOR gates. Another implementation of the multi-input XOR gate uses a tree of XOR gates. As shown in the papers of Yoneyama et al. and Murata et al., the circuit 20 requires elaborate circuit elements to align the timing of all K output data. For simplicity, the circuit elements for timing alignment are not shown in FIG. 2. In FIG. 2, the output of 40(K) has no gate delay but the output of 40(1) has (K−1) gate delays from the XOR gates of 10(K−1) to 10(1) in the ladder of XOR gates 32. As an indication of the difficulty, a four-input circuit in Yoneyama et al. requires two separate integrated circuits (ICs) occupied mostly by many electrical components used to compensate for gate delay. The requirement of timing alignment makes the prior parallel precoding circuits of EP1,026,863, Yoneyama et al., and Murata et al. for the parallel precoder very difficult to implement, especially for very large number of parallel inputs K.

Needed is a precoder design that can manage timing issues while accommodating large numbers of parallel inputs efficiently.

SUMMARY

According to one aspect of the present invention, a circuit using modular based parallel processing calculates the cumulative parity of a binary number input sequence. The circuit is used, for example, to implement a precoder for an optical duobinary transmission system. The design permits a relatively low-speed circuit to be used as the precoder before a time-division multiplexer. The parallel circuit can be scalable to process a very large number of sets of parallel binary data by the usage of two basic modules, namely, a parity module and a delay module.

A circuit to calculate the cumulative parity of a binary number sequence according to a presently preferred embodiment is presented in another aspect of the present invention. The circuit includes an array of functional modules. The modules are aligned to form columns and rows within the array. The array is configured to receive the binary number sequence at a first column of the modules. The array is configured to produce the cumulative parity as output at a last column of the modules. Each module is either a parity module or a delay module. A parity module is configured to receive certain input bits from either the binary number sequence or from a previous column and to calculate the parity of the certain input bits. A delay module is configured to receive other input bits from either the binary number sequence or from a previous column and to delay the other input bits.

A circuit to calculate the cumulative parity of a binary number sequence according to a presently preferred embodiment is presented in another aspect of the present invention. The circuit includes an array of delay elements, diagonal gate elements, and column gate elements. The delay elements are aligned to form M+1 columns and M rows within the array, where M represents a number of parallel input bit values. The array is configured to receive the binary number sequence at the first column of the delay elements and to produce the cumulative parity as output at the (M+1)th column of the delay elements. The array includes diagonal delay elements, non-diagonal delay elements, and (M+1)th column delay elements. The diagonal delay elements form a diagonal of an M column by M row inner array of the array, from the first row and the first column to the Mth row and the Mth column of the array. The non-diagonal delay elements are the remaining delay elements within the inner array. The diagonal gate elements are located from the second row through the Mth rows of the array. The diagonal gate elements calculate parity information. The diagonal gate elements each have a diagonal gate output connected to a diagonal delay input of the corresponding diagonal delay element in the same row and the next column of the array, a first diagonal gate input connected to a diagonal delay output of the corresponding diagonal delay element in the prior row and the previous column of the array, and a second diagonal gate input connected to a non-diagonal delay output of the corresponding non-diagonal delay element in the same row and the previous column of the array. The column gate elements are located from the first row to the Mth row of the array and between the Mth column and the (M+1)th column of the array. The column gate elements each having a column gate output connected to a column delay input of the corresponding (M+1)th column delay element in the same row of the array. The column gate elements are used to pass the parity information from the diagonal and non-diagonal outputs of respective diagonal and non-diagonal delay elements in prior columns of the array to the (M+1)th column delay elements.

A method of using an array of M(M+1) modules to calculate the cumulative parity of a binary number sequence according to a presently preferred embodiment is presented in another aspect of the present invention. The array includes M rows of M+1 modules and M+1 columns of M modules. Within a first clock cycle T, the cumulative parity of a first input group of n input bit values and a first initial parity input value is calculated at the first row first column module, a second input group of n input bit values is delayed at the second row first column module, and an Mth input group of n input bit values is delayed at the Mth row first column module. Within a second clock cycle 2T, the cumulative parity of the first input group is delayed at the first row second column module, the cumulative parity of the second input group and a second initial parity input bit value is calculated at the second row second column module, and the Mth input group is delayed at the Mth row second column module. Within an Mth clock cycle MT, the cumulative parity of the first input group is delayed at the first row Mth column module, the cumulative parity of the second input group is delayed at the second row Mth column module, and the cumulative parity of the Mth input group and an Mth initial parity input bit value is calculated at the Mth row Mth column module. Within an (M+1)th clock cycle (M+1)T, a first output group of n output bit values is calculated at the first row (M+1)th column module, a second output group of n output bit values is calculated at the second row (M+1)th column module, and an Mth output group of n output bit values is calculated at the Mth row (M+1)th column module.

A method of calculating the cumulative parity of a binary number sequence using an array of parity and delay modules to calculate the cumulative parity of a binary number sequence according to a presently preferred embodiment is presented in another aspect of the present invention. The array includes M rows of M+1 modules and M+1 columns of M modules. The binary number sequence is received at a series of inputs at the first column of the array. Parity information is calculated using parity modules of the array. The parity information is passed through the array, column by column, from the first column to the (M+1)th column. The timing of the parity information is aligned using delay modules of the array. The cumulative parity of the binary number sequence is provided at a series of outputs at the (M+1)th column of the array.

BRIEF DESCRIPTION OF THE DRAWINGS

The foregoing and other features, aspects, and advantages will become more apparent from the following detailed description when read in conjunction with the following drawings, wherein.

DETAILED DESCRIPTION OF THE PRESENTLY PREFERRED EMBODIMENTS

According to one aspect of the present invention, a method is provided to design a precoding circuit for the generation of very high speed signals to be utilized in an optical fiber communication system in a systematic and modular way. Mathematically, the precoding circuit calculates the cumulative parity of a binary number input sequence using parallel processing. When implemented as a precoder in an optical duobinary transmission system, the precoding circuit can be used to precode the binary sequence before instead of after a time-division multiplexer.

Even with a very large number of sets of parallel input data, the circuit consists of only two basic building modules: a parity module and a delay module. Dividing a serial binary data input sequence into many sets of parallel data streams, the circuit is capable to handle very high transmission rate by a simple configuration.

The parity module calculates the cumulative parity of an initial parity input and n parallel binary data inputs, and provides n parallel outputs, preferably after one clock cycle. The delay module delays the n parallel binary data inputs, preferably for one clock cycle.

Using the precoding circuit, sets of parallel data are divided into M groups of n sets of parallel data. Preferably, all parity modules and delay modules are in row and column arrangement. There are M rows of modules for each group of parallel data. Each group of parallel data are processed using M+1 columns of modules. The n parallel outputs of each module are connected to the n parallel inputs of the module in the same row and the next column. The last output bits of the parity module may connect to the initial parity input of some other parity modules.

The modular and scalable circuit can be used as the parallel precoder of a duobinary transmitter placed before a time-division multiplexer. The circuit can also be used for other applications requiring the calculation of the cumulative parity of the inputs.

The present invention will now be described in detail with reference to the accompanying drawings, which are provided as illustrative examples of preferred embodiments of the present invention.

Figure 3:
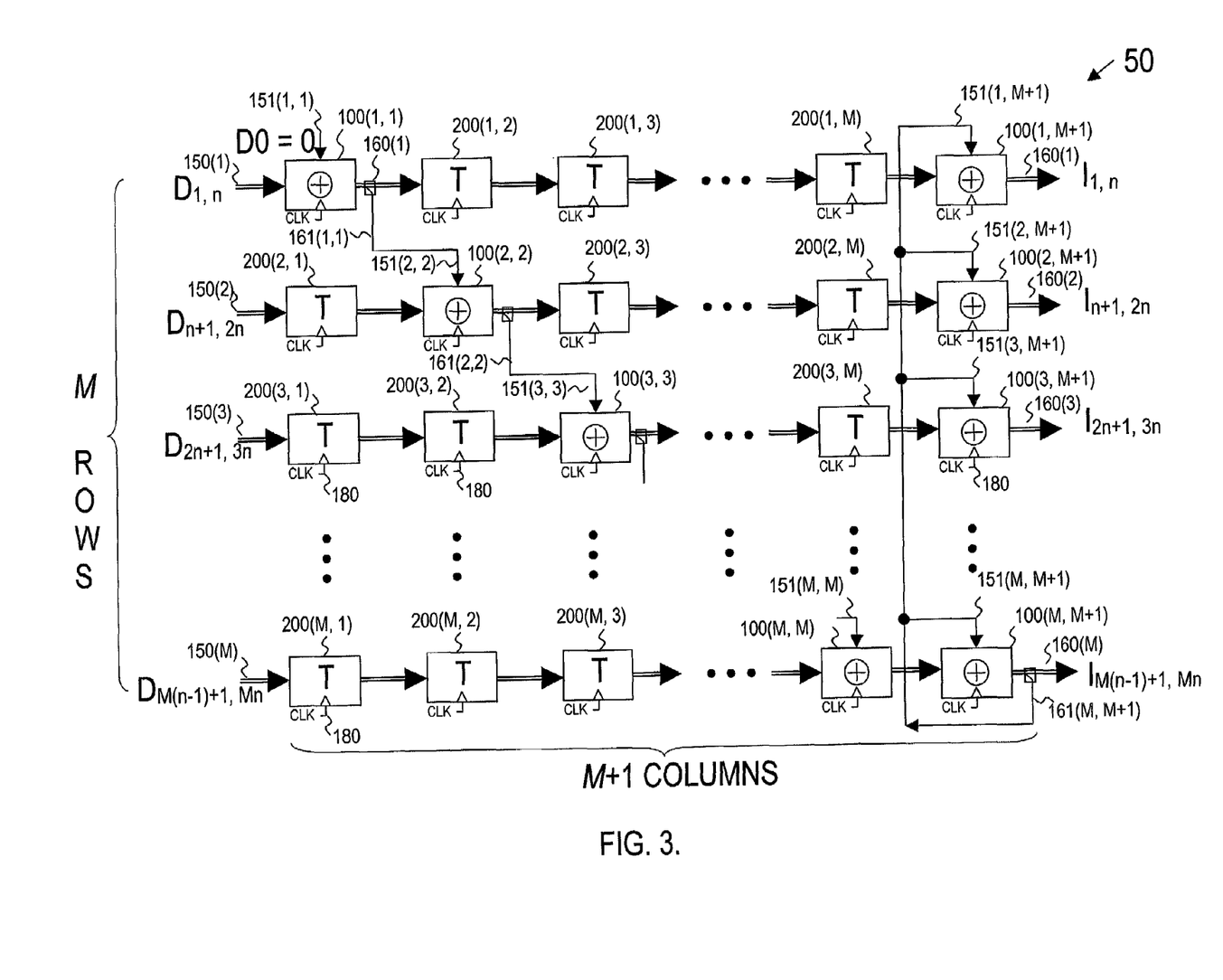
FIG. 3 is a block diagram illustrating an exemplary modular and scalable parallel precoding circuit according to a presently preferred embodiment.

FIG. 3 is a block diagram illustrating an exemplary modular and scalable parallel precoding circuit 50 according to a presently preferred embodiment that incorporates aspects of the presently preferred methods and systems described herein. The precoding circuit 50 of FIG. 3 preferably uses two types of functional modules, a parity module 100 and a delay module 200. The parity module 100 and a delay module 200 are preferably implemented by circuits, examples of which are described in more detail below. All of the parity modules 100 and the delay modules 200 are arranged in an array of modules having a total of M rows and M+1 columns. M parity modules 100(1, 1), 100(2, 2), ..., 100(M, M), that is, 100(i, i) for i from 1 to M, are in the diagonal position of an inner array within the array of modules. The inner array has M rows and M columns, that is, the columns 1 through M of the array of modules. Another M parity modules 100(1, M+1), 100(2, M+1), ..., 100(M, M+1) are in the last column M+1 of the array of modules. M(M−1) delay modules 200(1, 2), 200(3,1), ..., 200(M−1, M), that is, 200(i, j) for i not equal to j, and i and j from 1 to M, are located in non-diagonal positions in the inner array within the array of modules.

In FIG. 3, other than the clock signal CLK 180, each of the delay modules 200 has the same number of inputs and outputs n. Other than the clock signal CLK 180, each of the parity modules 100 has n+1 inputs and n outputs. The preceding circuit 50 in FIG. 3 operates with K=Mn parallel sets of data as both inputs and outputs. The K=Mn parallel sets of input data $D_{1,n}, D_{n+1,2n}, \ldots D_{M(n+1)+1,Mn}$ are received at inputs of M input groups 150(1), 150(2), ..., 150(M). Each of the input groups 150(1), 150(2), ..., 150(M) has n parallel inputs to respectively receive n sets of parallel data. The K=Mn parallel sets of output data $I_{1,n}, I_{n+1,2n}, \ldots I_{M(n+1)+1,Mn}$ are output by the circuit 50 at outputs of M output groups 160(1), 160(2), ..., 160(M). Each of the output groups 160(1), 160(2), ..., 160(M) has n parallel inputs to respectively output n sets of parallel data.

Figure 4:
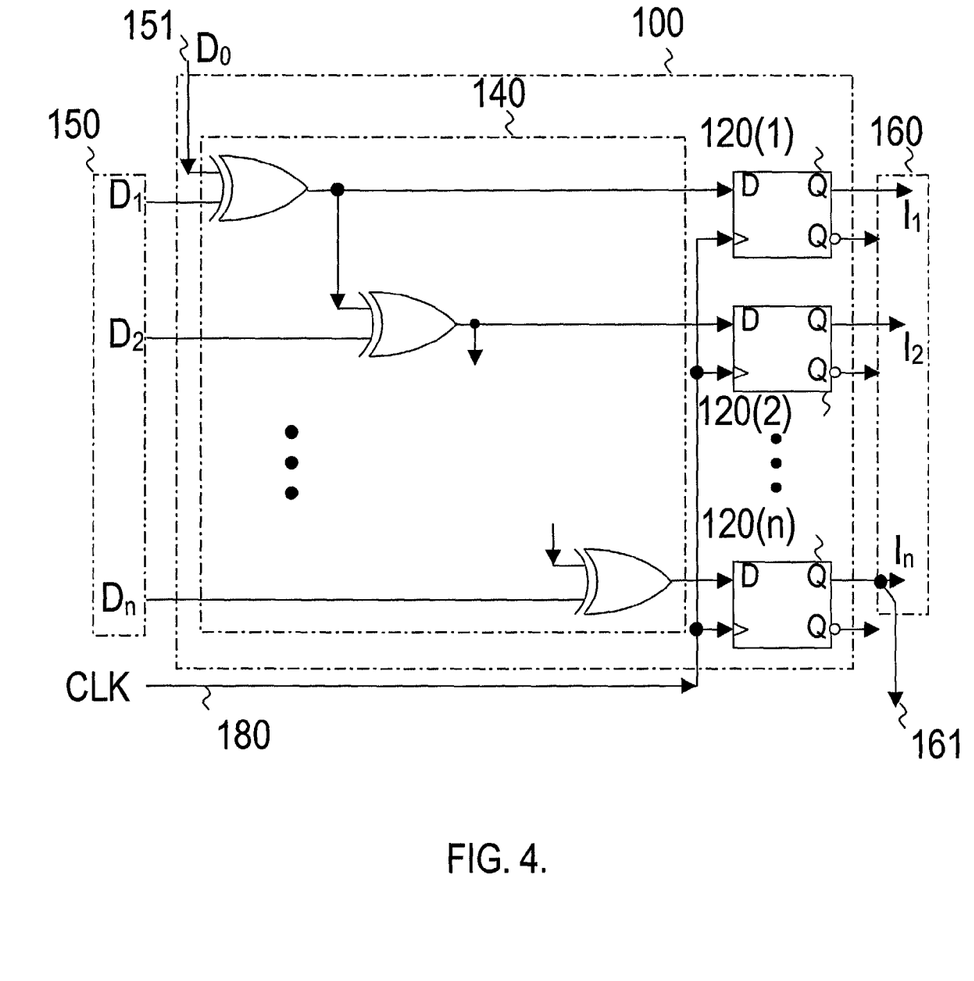
FIG. 4 is a block diagram illustrating one exemplary configuration of the parity module according to FIG. 3.
Figure 5:
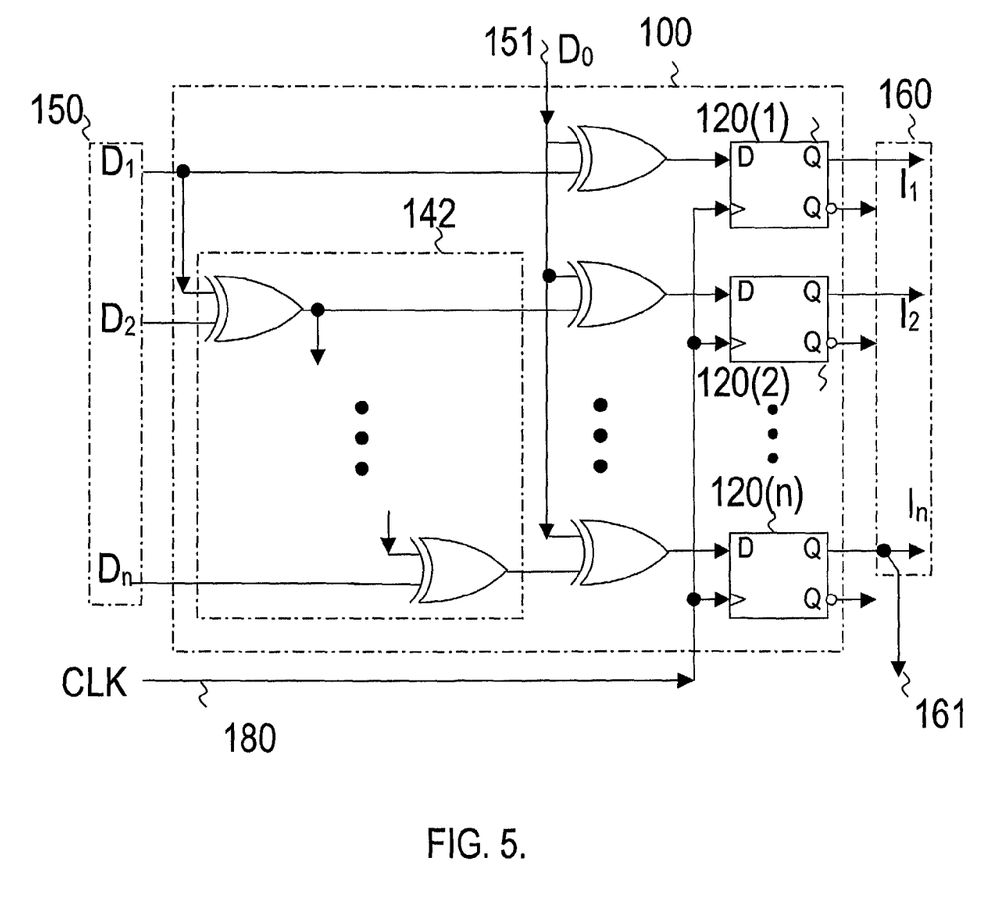
FIG. 5 is a block diagram illustrating another exemplary configuration of the parity module according to FIG. 3.

FIGS. 4 and 5 are block diagrams illustrating two exemplary configurations of the parity module 100 according to FIG. 3. The parity module 100 has n parallel inputs 150 to respectively receive n exemplary parallel sets of input data $D_1$ to $D_n$, and n parallel outputs 160 to respectively output n exemplary parallel sets of input data $I_1$ to $I_n$. The parity module 100 has an additional initial parity input of $D_0$ 151. The first output of the parity module 100 is the parity of $D_0$ and $D_1$; that is, $I_1 = D_0 + D_1$ (mod 2). The second output of the parity module 100 is the parity of $D_0$, $D_1$, and $D_2$; that is, $I_2 = D_0 + D_1 + D_2$ (mod 2). In general, for i from 3 to n, the ith output of the parity module is the parity of $D_0$ to $D_i$; that is, $I_i = D_0 + D_1 + \ldots + D_i$ (mod 2). In the configuration of FIG. 4, the cumulative parities of the inputs 150 and 151 are calculated by a ladder of XOR gates 140. Another configuration to calculate the cumulative parities is shown in FIG. 5. To align the timing of the outputs 160, a bank of D-type flip-flops 120(1), 120(2) to 120(n) are used, synchronized by the trigger from the clock signal CLK 180. The last bit of the parallel output 161 may be branched out separately from the parallel outputs 160. This special branch out, for example, the parallel output 161(1, 1), is preferably used in parity modules 100(1, 1), 100(2, 2), ..., 100(M−1, M−1) located along a diagonal of the inner array and the parity module 100(M, M+1) in the last column M+1 of the array in FIG. 3. In both of the exemplary configurations of FIGS. 4 and 5, the number of parallel inputs n is limited by the gate delays of the respective XOR ladder 140, 142 and the bank of D-type flip-flops 120(1), 120(2) to 120(n). A conservative design goal for the delay of each gate is 1/(2n) of one-bit interval.

Figure 6:
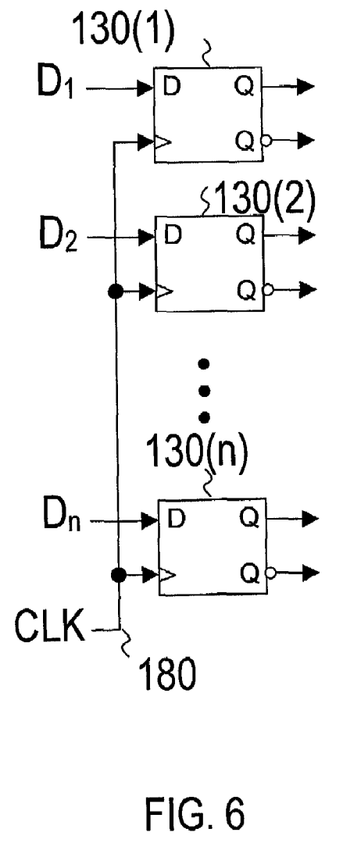
FIG. 6 is a block diagram illustrating one exemplary configuration of the delay module according to FIG. 3.

FIG. 6 is a block diagram illustrating one exemplary configuration of the delay module 200 according to FIG. 3. The delay module of FIG. 6 uses a bank of n D-type flip-flops 130(1), 130(1) to 130(n), synchronized by the trigger from the clock signal CLK 180.

In the precoding circuit of FIG. 3, for modules 100, 200 in the same row, the inputs of the delay module 200 are connected to the outputs of the module in the previous column, either the parity module 100 or the delay module 200. The initial parity input 151(1, 1) of the parity module in the first column and first row 100(1, 1) is preferably connected to logic "0". The initial parity input of other parity modules 100 in other diagonal position 100(2, 2) to 100(M, M) are connected to the last bit output of the parity module 100 in the previous column and previous row, that is, 151(i, i) connected to 161(i−1, i−1) for all i from 2 to M, as an example, 151(2, 2) to 161(1, 1). The n parallel inputs of parity modules 100 are connected to the n parallel outputs of the delay module 200 or the parity module 100 in the previous column in the same row. The first input of the n parallel inputs of a module 100, 200 is connected to the first output of either the parity module 100 or the delay module 200 in the previous column and the same row. The first input of the parity module 100 is the first parallel input, not the initial parity input. The second input of the n parallel inputs of a module 100, 200 is connected to the second output of either the parity module 100 or the parity module 200 in the previous column and the same row. It continues similarly through the inputs of a module 100, 200 so that, for example, the nth or the last input of the n parallel inputs of a module 100, 200 is connected to the nth or the last output of either the parity module 100 or the parity module 200 in the previous column and the same row.

In FIG. 3, the last output bit value $I_{Mn}$ of the outputs $I_1$, $I_2$, ..., $I_{Mn}$, which corresponds to the last output 161(M, M+1) of the Mth row (M+1)th column parity module 100(M, M+1), is presented at the initial parity inputs 151(1,

M+1), 151(2, M+1), ..., 151(M, M+1) of all of the parity modules 100(1, M+1), 100(2, M+1), ..., 100(M, M+1) in the last column M+1 of the array of modules in the circuit 50.

Figure 7:
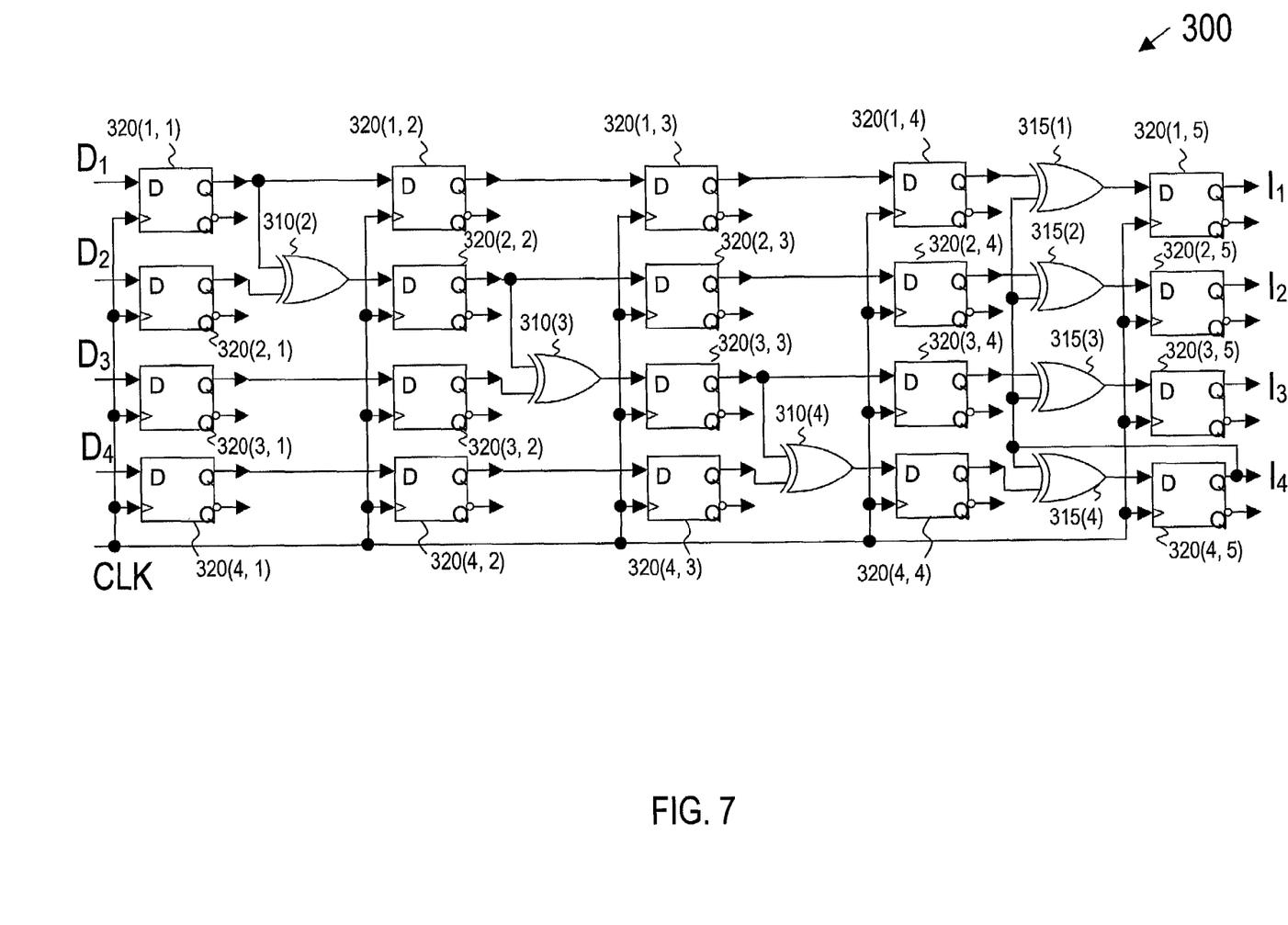
FIG. 7 is a block diagram illustrating one exemplary, four-input configuration of the precoding circuit of FIG. 3.

FIG. 7 is a block diagram illustrating one exemplary, four-input configuration 300 of the precoding circuit 50 of FIG. 3. The exemplary configuration 300 of FIG. 7 has n=1 and K=M=4 for four sets of parallel input and output data. The D-type flip-flops 320 (2,1), 320 (3,1), 320 (4, 1), 320 (1,2), 320 (3,2), 320 (4,2), 320 (1,3), 320 (2,3), 320 (4,3), 320 (1,4), 320 (2,4), 320 (3,4), 320 (1,5), 320 (2,5), 320 (3,5), 320 (4,5) in the non-diagonal position are equivalent to the exemplary delay module 200 in FIG. 6 for a single input (n=1). The D-type flip-flop in the first column and first row 320(1, 1) is the logic simplification of the exemplary parity module 100 in FIG. 4 for two inputs, including $D_0=0$ (n=1). That is, an XOR gate that has inputs of $D_1$ and $D_0=0$ equals $D_1$ at its output, so that the XOR gate is not needed for the parity module, and the input $D_0=0$ is not shown FIG. 7. Other D-type flip-flops 320(2, 2), 320(3, 3), 320(4, 4) in the diagonal position combined with the respective corresponding diagonally located XOR gate 310(2), 310(3), 310 (4) in the same row, are the exemplary parity module 100 of FIG. 4 for single (non initial parity) input and output (n=1). The other input, that is, the initial parity input of the diagonally located XOR gate 310(2), 310(3), 310(4) is connected to the output, that is, the last output with n=1, from the respective D-type flip-flop 220(1, 1), 320(2, 2), 320(3, 3) in the previous row and column. The bank of D-type flip-flops 320 (1,5), 320 (2,5), 320 (3,5), 320 (4,5) in the last column M+1, combined with the bank of XOR gates 315(1), 315(2), 315(3), 315(4) is equivalent to a bank of parity modules 200 of FIG. 4 for two inputs, including the initial parity input receiving the bit value 161(4,5).

As used herein, the term delay element is intended broadly to refer to a circuit element that outputs the value of bits received at its input following a period of time, such as one or more clock cycles. For example, a delay element may be implemented as a D-type flip-flop. In a D-type flip flop having a one clock cycle delay, when the CLK input of the flip flop is changed from a logical zero to a logical one, the output of the flip flop reflects the logic level present at the input. When the CLK input falls to logic zero, or changes from one to zero, the last state of the input is trapped and held in the flip flop. The D-type flip flop may also be called the edge-trigged D-type flip-flop. The D-type flip-flop may be constructed by connecting Set Rest (SR) flip-flops or latches, some NAND gates, other logic gates, or other types of flip-flop together. Some memory devices can be used to function as the D-type flip-flop. Although in a presently preferred embodiment, the delay element includes the D-type flip flop, other devices are possible, such as other flip-flops, logic gates, or memory devices.

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A circuit to calculate the cumulative parity of a binary number sequence, comprising:
   an array of functional modules, the modules aligned to form columns and rows within the array, the array configured to receive the binary number sequence at a first column of the modules and to produce the cumulative parity as output at a last column of the modules, each of the modules being one of:
   a parity module configured to receive certain input bits from one of the binary number sequence and a previous column and to calculate the parity of the certain input bits; and
   a delay module configured to receive other input bits from one of the binary number sequence and a previous column and to delay the other input bits,
   wherein
   the parity modules form the last column of the modules,
   the first column of modules to the second to last column of modules forms an inner array having an equivalent number of rows and columns of modules, and
   within the inner array of modules the parity modules form a diagonal of the inner array from a first row to a last row and the delay modules are the remaining modules within the inner array.

2. The circuit of claim 1, wherein calculations within the array proceed from the first column to the last column and the array includes one more column than row.

3. The circuit of claim 1, wherein each parity module comprises:
   n parallel inputs;
   an initial parity input at which to receive an initial parity bit; and
   n parallel outputs, wherein the ith bit of the n parallel outputs is the parity of the first i bits of the n parallel inputs and the initial parity input.

4. The circuit of claim 3, wherein after one clock cycle following the arrival of certain input bits at the n parallel inputs, resultant output bits are provided from the n parallel outputs.

5. The circuit of claim 1, wherein any delay modules within the same row of the array have the same number of inputs and outputs.

6. The circuit of claim 1, wherein within a given row of the array, the number of parallel inputs and outputs of any parity module is equal to the number of inputs and outputs of any delay module.

7. The circuit of claim 3, wherein the last parallel output of each parity module that forms a diagonal within the inner array of the array, except for the parity module in the last row of the inner array, is connected to the initial parity input of the parity module in the next column and the next row.

8. The circuit of claim 3, wherein the last parallel output of the parity module in the last row and the last column is connected to the initial parity input of each parity module in the last column.

9. The circuit of claim 3, wherein the initial parity input of the parity module in the first row and the first column is connected to logic zero.

10. The circuit of claim 3, wherein each delay module comprises:
    n parallel inputs; and
    n parallel outputs; wherein output bits on the n parallel outputs are equivalent to other input bits received at the n parallel inputs, delayed for one clock cycle.

11. The circuit of claim 10, wherein the n parallel outputs of a given module of the array in a given row and column of the array, except for the last column, are connected to the n parallel inputs of the module in the same row and the next column of the array.

12. The circuit of claim 1, wherein a number of inputs of the party module exceed the a number of outputs of the parity module by one, wherein output bits are provided from the outputs of the parity module, and wherein the first output provides a first output bit that is the parity of the certain input bits received at the first two inputs, the second output provides a second output bit that is the parity of the certain input bits received at the first three inputs, and the ith output provides an ith output bit that is the parity of the certain input bits received at the first i+1 outputs.

13. The circuit of claim 1, wherein a first number of other input bits received by a delay module in one row of the array is not equivalent to a second number of other input bits received by a delay module in another row of the array.

14. The circuit of claim 1, wherein a first number of certain input bits received by a parity module in one row of the array is not equivalent to a second number of certain input bits received by a parity module in another row of the array.

15. The circuit of claim 1, further comprising:
at least one circuit element to align the timing and the delay of logic gates within the circuit and the array.

16. The circuit of claim 1, wherein each delay module comprises at least one D-type flip flop.

17. The circuit of claim 1, wherein each delay module comprises a bank of D-type flip-flops.

18. The circuit of claim 1, wherein each delay module comprises a component having a triggered delay for one clock cycle.

19. The circuit of claim 1, wherein each parity module comprises at least one D-type flip-flop.

20. The circuit of claim 1, wherein, each parity module comprises at least one XOR gate and at least one D-type flip-flop.

21. The circuit of claim 1, wherein each parity module comprises a ladder of XOR gates and a bank of D-type flip-flops.

22. The circuit of claim 1, wherein each parity module comprises a ladder of XOR gates, a bank of XOR gates, and a bank of D-type flip-flops.

23. The circuit of claim 1, wherein the circuit is used as the differential precoder before a time-division multiplexer for a duobinary transmitter in an optical communication system.

24. The circuit of claim 1, wherein the circuit is used as the differential precoder for duobinary transmission, the differential precoder operating in parallel and having at least two parallel inputs.

25. A circuit to calculate the cumulative parity of a binary number sequence, comprising:
an array of delay elements, the delay elements aligned to form M+1 columns and M rows within the array, where M represents a number of parallel input bit values, and wherein the array is configured to receive the binary number sequence at the first column of the delay elements and to produce the cumulative parity as output at the (M+1)th column of the delay elements, the array comprising:
diagonal delay elements forming a diagonal of an M column by M row inner array of the array, from the first row and the first column to the Mth row and the Mth column of the array;
non-diagonal delay elements, wherein the non-diagonal delay elements are the remaining delay elements within the inner array; and
the (M+1)th column delay elements;
diagonal gate elements located from the second row through the Mth rows of the array to calculate parity information, the diagonal gate elements each having a diagonal gate output connected to a diagonal delay input of the corresponding diagonal delay element in the same row and the next column of the array, a first diagonal gate input connected to a diagonal delay output of the corresponding diagonal delay element in the prior row and the previous column of the array, and a second diagonal gate input connected to a non-diagonal delay output of the corresponding non-diagonal delay element in the same row and the previous column of the array; and
column gate elements located from the first row to the Mth row of the array and between the Mth column and the (M+1)th column of the array, the column gate elements each having a column gate output connected to a column delay input of the corresponding (M+1)th column delay element in the same row of the array, the column gate elements used to pass the parity information from the diagonal and non-diagonal outputs of respective diagonal and non-diagonal delay elements in prior columns of the array to the (M+1)th column delay elements.

26. The circuit of claim 25, wherein the diagonal and column gate element each comprise an XOR gate.

27. The circuit of claim 25, wherein for any of the diagonal delay elements in the first through the (M−1)th columns, the respective diagonal delay output is connected to the non-diagonal delay output of the corresponding non-diagonal delay element in the same row and the next column of the array.

28. The circuit of claim 25, wherein the column gate elements each have a column gate input connected to a column delay output of the (M+1)th column delay element in the Mth row of the array.

29. The circuit of claim 28, wherein the column gate elements from the first row to the (M−1)th row of the array each have a second column gate input connected to the non-diagonal delay output of the corresponding non-diagonal delay element in the Mth column of the array.

30. The circuit of claim 28, wherein the column gate element in the Mth row of the array has a second column gate input connected to the diagonal delay output of the diagonal delay element in the Mth row of the array.

31. A method of using an array of M(M+1) modules to calculate the cumulative parity of a binary number sequence, the array comprising M rows of M+1 modules and M+1 columns of M modules, the method comprising:
within a first clock cycle T:
calculating the cumulative parity of a first input group of n input bit values and a first initial parity input value at the first row first column module;
delaying a second input group of n input bit values at the second row first column module; and
delaying an Mth input group of n input bit values at the Mth row first column module;
within a second clock cycle 2T:
delaying the cumulative parity of the first input group at the first row second column module;
calculating the cumulative parity of the second input group and a second initial parity input bit value at the second row second column module; and
delaying the Mth input group at the Mth row second column module;
within an Mth clock cycle MT:
delaying the cumulative parity of the first input group at the first row Mth column module;
delaying the cumulative parity of the second input group at the second row Mth column module; and calculating the cumulative parity of the Mth input group and an Mth initial parity input bit value at the Mth row Mth column module; and within an (M+1)th clock cycle (M+1)T:

calculating a first output group of n output bit values at the first row (M+1)th column module;

calculating a second output group of n output bit values at the second row (M+1)th column module; and calculating an Mth output group of n output bit values at the Mth row (M+1)th column module.

32. The method of claim 31, wherein the first row first column module, the second row second column module, and the Mth row Mth column module are parity modules.

33. The method of claim 31, wherein all modules in the (M+1)th column of the array are parity modules.

34. The method of claim 31, wherein the second row first column module, the Mth row first column module, the first row second column module, the Mth row second column module, the first row Mth column module, and the second row Mth column module are delay modules.

35. The method of claim 31, wherein the nth output bit value of the first output group is the cumulative parity of n output bit values of the first row Mth column module and of an (M+1)th initial parity input bit value.

36. The method of claim 35, wherein the nth output bit value of the second output group is the cumulative parity of n output bit values of the second row Mth column module and of the (M+1)th initial parity input bit value.

37. The method of claim 36, wherein the nth output bit value of the Mth output group is the cumulative parity of n output bit values of the Mth row Mth column module and of the (M+1)th initial parity input bit value.

38. The method of claim 37, wherein the (M+1)th initial parity input bit value is the nth output bit value of the Mth output group, delayed by one clock cycle T.

39. A method of calculating the cumulative parity of a binary number sequence using an array of parity and delay modules, the array comprising M rows of M+1 modules and M+1 columns of M modules, the method comprising:

receiving the binary number sequence at a series of inputs at the first column of the array;

calculating parity information using parity modules of the array;

passing parity information through the array, column by column, from the first column to the (M+1)th column;

aligning the timing of the parity information using delay modules of the array; and providing the cumulative parity of the binary number sequence at a series of outputs at the (M+1)th column of the array.

40. A system to calculate the cumulative parity of a binary number sequence using an array of modules, the array comprising M rows of M+1 modules and M+1 columns of M modules, the method comprising:

means for receiving the binary number sequence at a series of inputs at the first column of the array;

means for calculating parity information;

means for passing parity information through the array, column by column, from the first column to the (M+1)th column;

means for aligning the timing of the parity information; and means for providing the cumulative parity of the binary number sequence at a series of outputs at the (M+1)th column of the array.

* * * * *